F. C. WICKEL.
EMBOSSING DEVICE.
APPLICATION FILED APR. 19, 1910.
1,009,456.
Patented Nov. 21, 1911.
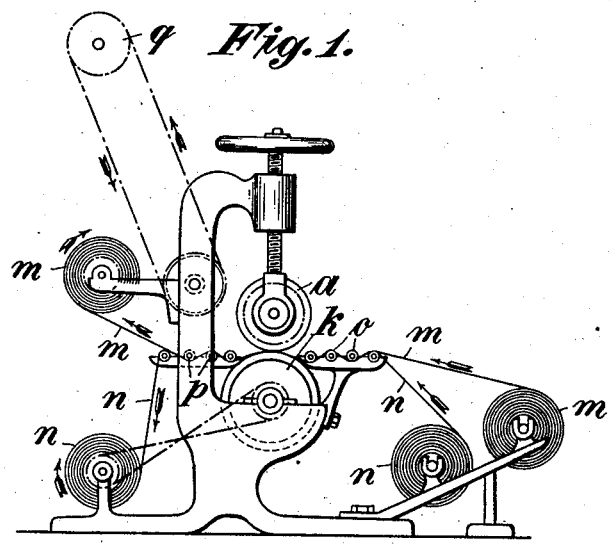
Fig. 1.
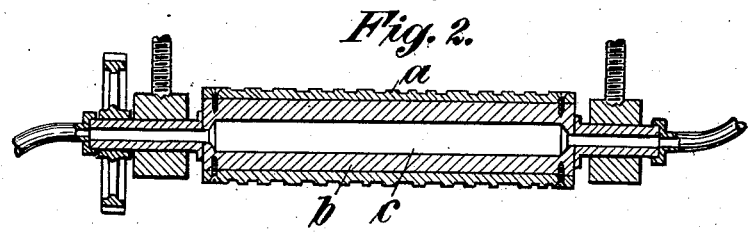
Fig. 2.
Fig. 5.     Fig. 3.     Fig. 4.
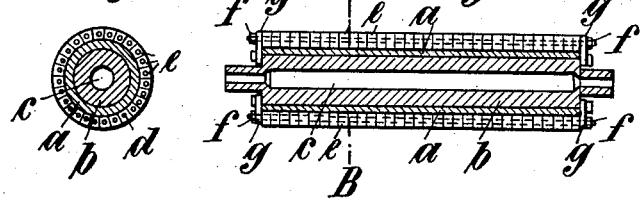
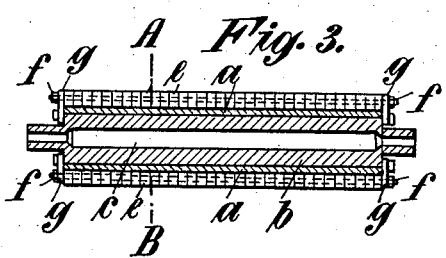
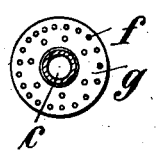
Fig. 6.     Fig. 7.
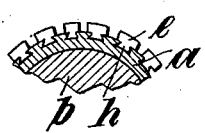
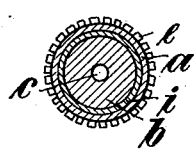
WITNESSES
INVENTOR
Fritz Carl Wickel

UNITED STATES PATENT OFFICE.

FRITZ CARL WICKEL, OF PARIS, FRANCE.

EMBOSSING DEVICE.

1,009,456.     Specification of Letters Patent.     Patented Nov. 21, 1911.

Application filed April 19, 1910. Serial No. 556,440.

*To all whom it may concern:*

Be it known that I, FRITZ C. WICKEL, a subject of the Emperor of Germany and the King of Prussia, residing at 5 Rue Michel Charles, Paris, France, have invented a new and useful Improvement in Embossing Devices, of which the following is a specification.

The present invention refers to embossing devices for carrying out hot and rilievo embossing in gold, silver, metallic and body colors and the like by means of rollers.

One of the most effective means of ornamenting paper and fabrics is the rilievo embossing with metal foils, color foils and the like in gold, silver, metallic colors, body colors and the like. It was found impossible to carry out this kind of work by the rotary process, for producing endless pieces for wholesale production of papers and calicos and particularly for making wall papers in endless pieces, for the reason, that the material to be transferred by hot embossing to the respective backing was to be had only in very small sizes or in case embossing paper and embossing foils were used, only in comparatively small sheets, for the only machine hitherto known for carrying out hot embossing work is the hot embossing press, which is used as screw-toggle press and in similar designs. On this machine only comparatively small sizes can be embossed, as would also be natural with the small dimensions in which the gold leaf is to be had. The embossing papers on the market afforded an advantage over metal foil in so far as they allowed of simplifying the tedious and troublesome work of placing the metal foil in many instances. Such embossing papers however did not equal the real metal foil with respect to their gloss and the like. Embossing with metal foil is expensive and tedious as it is very complicated. The material to be embossed must be first covered all over in a uniform manner with metal foil which is difficult to handle. Hereupon the heated embossing tool is forced against the stuff by means of a lever pressure, this being generally done by hand, so that metal foil (or embossing foil) will adhere to the prepared surfaces of the paper or fabric at the points of contact, whereby an embossed ornamentation, inscription or the like is produced on the material in gold, silver or other color. If it is considered, that such embossing operation has to be repeated many times for certain purposes, as in case of cardboard boxes, book covers, cigarette packages, chocolate packages, calendars and the like, and that the surface to be there embossed frequently amounts to only five per cent. of the total surface and that all the remainder of the metal foil employed,—thus about ninety five per cent.— generally becomes useless for the same purpose, it will be evident, that a process, which remedies all these disadvantages, such as waste of time and material, will meet a much felt want in the respective industries.

The apparatus forming the subject of the present invention does not alone remove the disadvantages of the known process but allows also of producing new and valuable articles such as for the fancy and art paper industry, for wall paper manufacture and the like. According to the present invention preferably the metal foil paper substitutes, made in endless rolls are employed, or color foil papers of other makes, so far as they can be manufactured in endless pieces. Such embossing papers have the property of yielding their metallic or color film to the generally previously prepared paper and material at the points of contact and under the pressure of heated metal tools or the like, the pattern of the embossing tool thereupon appearing on the said material embossed in metal or colored rilievo.

The principle on which the present invention is based consists in producing a continuous, that is rotary hot rilievo embossing in such a manner, that suitable embossing paper unwinding in an endless piece from a roll is paid with its metallic or colored side against the surface of a material to be embossed, likewise unwinding in an endless piece from a roll, and both passed beneath a heated roller carrying the design to be embossed, said roller revolving under pressure on a comparatively elastic, smooth backing roller. Under the action of the heat and the pressure the raised design on the embossing roller will detach at the points of contact the color film from the embossing paper and transfer it in a continuous manner in form of a depressed rilievo embossing to the surface of the material prepared for its reception, whereupon both pieces are again wound up in form of rolls.

The accompanying drawing illustrates a constructional form of an apparatus.

Figure 1 shows the apparatus in a vertical longitudinal section. Fig. 2 is a transverse section through the heatable embossing roller. Fig. 3 illustrates another constructional form of the embossing roller in sectional view. Fig. 4 is an end view of the embossing roller shown in Fig. 3. Fig. 5 is a section along A—B in Fig. 3. Figs. 6 and 7 illustrate two other constructional forms of the embossing roller in sectional views.

The arrangement essentially resembles the customary embossing calenders and is provided with the screw and lever pressure devices of the latter. The chief difference consists in the provision of two unwinding and two winding attachments which may be operated in the usual manner, and particularly in the type and arrangement of the embossing roller and the backing roller. The upper roller, which carries the design to be embossed consists of a thick walled heatable cylinder. The raised design may be either produced directly on the wall of the cylinder or be fitted in form of an exchangeable mantle $a$, Fig. 2, on the cylinder $b$, provided with a hollow space $c$ for the purpose of allowing of its being heated. The designs may be produced by engraving, etching, stereotype or galvanic or any other suitable means. The cylinder $b$ or the mantle $a$ fitted on the same may be provided with suitable devices, by means of which different designs, types, ornaments and the like, may be attached in such a manner, that they can be heated from the inside of the cylinder. These designs, types and the like serving for various combinations are made in a manner similar to the types employed for book and embossed printing, however with the difference, that when joined together, they will not form a flat surface but a circle, the diameter of which varies according to the size of the respective types, but will be the same with types of the same size, that is types of the same series. These types and the like may be secured to the roller from the side, say in the manner shown in Fig. 3, by means of a steel rod $f$ passing through bores $d$ in a row of types $e$, said rod being secured in disks $g$ joined to the sides of cylinder $b$. The types may be secured also in another manner, such as shown in Fig. 6, by means of dovetailed grooves $h$ provided in the surface of the cylinder or that of its mantle, into which grooves the types $e$ or the like may be inserted from the side.

As already stated, different series and sizes of types necessitate different diameters of the circle formed by them, and it may therefore be advisable to adapt the core cylinder and the mantles in hand to these various diameters by fitting several smooth mantles one over the other, and fitting the type bearer proper on the uppermost mantle. Fig. 7 illustrates such an arrangement, where an intermediate mantle $i$ is arranged between the core cylinder $b$ and the type mantle $a$. Generally it will be preferable for such jobbing works, which are employed for large editions only, to manufacture the mantle carrying the design by stereotype means similar to those employed for printing cylinders for rotary printing presses.

The type roller revolves under pressure against a smooth backing roller $k$ made of heat proof material, the diameter of which is somewhat larger than that of the type roller. The covering of the backing roller must be comparatively hard, yet still somewhat elastic and softer than the metal of the design, so as to prevent on the one hand the wear of the latter, and on the other hand safeguard sharply defined embossings. A material suitable for such purpose is vulcanized caoutchouc asbestos (Durit).

Of the two rollers $a$ and $k$ preferably only one, the design bearing roller is driven, while the backing roller will be carried along by friction. This depends both on the pattern to be embossed and on the thickness of the paper or material. In the present design the drive is effected from the countershaft $q$. Between the two rollers $a$ and $k$ the two bands of the embossing paper $m$ and the material to be embossed arranged in the hereinbefore described position to each other are guided by means of the rollers $o$. Under the action of the pressure and the heat of the embossing cylinder $a$ the embossing paper will yield its bronze or color film at the points of contact, that is the raised parts of the embossing cylinder $a$ forming the design on the surface to be embossed of the material $n$, this operation being a continuous one, whereupon both bands after they have passed the guide rollers $p$ are again separated and wound up in two separate rolls. The finished embossed band $n$ is then cut to the marketable lengths, while the embossing paper may, according to the design, be used several times over, so that the film on its surface is gradually used up entirely.

Besides the possibility of producing new articles such as metallic relievo embossings on decorated fancy papers, wall papers and the like, the present apparatus allows, contrary to the hitherto employed devices of a very considerable saving in material, together with a hereunto never attained rapidity of transfer, in consequence of which facts the products thereby obtained may be greatly reduced in price.

Having thus described my invention, what I claim and desire to secure by Letters Patent of the United States is:

1. In a roller embossing machine, an upper heatable cylinder for carrying the design to be embossed, a smooth backing roller of heat-proof material of greater diameter than the embossing cylinder, means for revolving one of said rollers, means for feeding a band of embossing material and the material to be embossed between said cylinders, and means whereby said bands are separated, and means for winding them up on separate rolls.

2. In a roller embossing machine, an upper heatable cylinder for carrying the design to be embossed, a smooth backing roller of heat-proof material of greater diameter than the embossing cylinder, means for revolving one of said rollers, means for feeding a band of embossing material and the material to be embossed between said cylinders, means for winding them up on separate rolls, and guide rollers interposed between said cylinders and the winding rolls.

3. In a roller embossing machine, an upper heatable cylinder for carrying the design to be embossed, a smooth backing roller of heat-proof material of greater diameter than the embossing cylinder, means for revolving one of said rollers, means for feeding a band of embossing material and the material to be embossed between said cylinders, means for winding them up on separate rolls, and guide rollers interposed between said cylinders and the winding rolls, the machine being constructed to allow of hot embossings to the full width and unlimited length of the bands.

Berlin, this fifth day of April, 1910.

FRITZ CARL WICKEL.

Witnesses:
 WOLDEMAR HAUPT,
 HENRY HASPER.

Copies of this patent may be obtained for five cents each, by addressing the "Commissioner of Patents, Washington, D. C."